United States Patent
Xiong et al.

(10) Patent No.: US 10,966,232 B2
(45) Date of Patent: Mar. 30, 2021

(54) PDCCH DESIGN FOR NARROWBAND DEPLOYMENT

(71) Applicant: Apple Inc., Cupertino, CA (US)

(72) Inventors: Gang Xiong, Beaverton, OR (US); Seunghee Han, Cupertino, CA (US); Debdeep Chatterjee, Santa Clara, CA (US); Jong-Kae Fwu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/324,441

(22) PCT Filed: Mar. 26, 2015

(86) PCT No.: PCT/US2015/022739
§ 371 (c)(1),
(2) Date: Jan. 6, 2017

(87) PCT Pub. No.: WO2016/018469
PCT Pub. Date: Feb. 4, 2016

(65) Prior Publication Data
US 2017/0223725 A1   Aug. 3, 2017

Related U.S. Application Data

(60) Provisional application No. 62/032,436, filed on Aug. 1, 2014.

(51) Int. Cl.
*H04W 72/12* (2009.01)
*H04L 5/00* (2006.01)
(Continued)

(52) U.S. Cl.
CPC ....... *H04W 72/1278* (2013.01); *H04L 5/0007* (2013.01); *H04L 5/0053* (2013.01);
(Continued)

(58) Field of Classification Search
CPC ............. H04W 72/1278; H04W 72/14; H04W 72/044; H04W 72/042; H04W 4/70;
(Continued)

(56) References Cited

U.S. PATENT DOCUMENTS

| 9,629,142 B2 | 4/2017 | Zhang et al. |
| 2008/0225965 A1* | 9/2008 | Pi .......................... H04L 1/0003 375/260 |

(Continued)

FOREIGN PATENT DOCUMENTS

| CN | 103457711 A | 12/2013 |
| CN | 103684675 A | 3/2014 |

(Continued)

OTHER PUBLICATIONS

ETSI TS 136 211 V8.9.0 (Jan. 2010) LTE; Evolved Universal Terrestrial Radio Access (E-UTRA); Physical channels and modulation (3GPP TS 36.211 version 8.9.0 Release 8). (Year: 2010).*

(Continued)

*Primary Examiner* — Ricardo H Castaneyra
(74) *Attorney, Agent, or Firm* — Eschweiler & Potashnik, LLC

(57) ABSTRACT

Narrowband Physical Downlink Control Channel (PDCCH) implementations are discussed. An example Evolved NodeB (eNB) comprises a memory storing instructions, a processor configured to execute the instructions, and a transmitter circuit. The processor is configured to determine at least one of downlink or uplink scheduling for one or more machine-type communication (MTC)-enabled user equipments (UEs); to generate, based at least in part on the determined scheduling, one or more MTC-physical downlink control channel (PDCCH) signals (M-PDCCH signals) associated with the one or more MTC-enabled UEs; and to perform channel coding, multiplexing, and scrambling of the one or (Continued)

more M-PDCCH signals. The transmitter circuit is configured to map the one or more M-PDCCH signals to resource element groups (REGs) in order of increasing subcarrier followed by orthogonal frequency division multiplexing (OFDM) symbol and to transmit the one or more M-PDCCH signals via a narrowband bandwidth of less than 1.4 MHz.

23 Claims, 8 Drawing Sheets

(51) Int. Cl.
  H04W 4/70    (2018.01)
  H04W 72/04   (2009.01)
  H04W 72/14   (2009.01)
(52) U.S. Cl.
  CPC ........... *H04W 4/70* (2018.02); *H04W 72/042* (2013.01); *H04W 72/044* (2013.01); *H04W 72/14* (2013.01); *H04W 72/1205* (2013.01)
(58) Field of Classification Search
  CPC ............. H04W 4/005; H04W 72/1205; H04L 5/0007; H04L 5/0053; H04L 27/26
  See application file for complete search history.

(56) References Cited

U.S. PATENT DOCUMENTS

| | | | |
|---|---|---|---|
| 2009/0300456 A1* | 12/2009 | Pelletier | H04L 1/1812 714/749 |
| 2010/0238984 A1* | 9/2010 | Sayana | H04B 7/0634 375/219 |
| 2010/0254268 A1* | 10/2010 | Kim | H04W 36/385 370/241 |
| 2013/0083753 A1 | 4/2013 | Lee et al. | |
| 2013/0094457 A1 | 4/2013 | Seo et al. | |
| 2013/0258953 A1 | 10/2013 | Huang et al. | |
| 2013/0308572 A1* | 11/2013 | Sayana | H04W 72/048 370/329 |
| 2014/0098761 A1 | 4/2014 | Lee et al. | |
| 2014/0341141 A1 | 11/2014 | Nguyen et al. | |
| 2015/0043394 A1* | 2/2015 | Lin | H04L 1/1861 370/280 |
| 2016/0127918 A1* | 5/2016 | Yi | H04W 16/26 370/329 |

FOREIGN PATENT DOCUMENTS

| | | |
|---|---|---|
| EP | 2557710 A2 | 2/2013 |
| WO | 2009/132203 A1 | 10/2009 |
| WO | 2014/003308 A1 | 1/2014 |

OTHER PUBLICATIONS

"LTE; Evolved Universal Terrestrial Radio Access (E-UTRA); Physical channels and modulation (3GPP TS 36.211 version 12.4.0 Release 12)." Technical Specification. ETSI TS 136 211 V12.4.0 (Feb. 2015) 126 pages.
"LTE Evolved Universal Terrestrial Radio Access (E-UTRA); Multiplexing and channel coding (3GPP TS 36.212 version 12.3.0 Release 12)." Technical Specification. ETSI TS 136 212 V12.3.0 (Feb. 2015). 91 pages.
"LTE; Evolved Universal Terrestrial Radio Access (E-UTRA); Physical layer procedures (3GPP TS 36.213 version 12.4.0 Release 12)." Technical Specification. ETSI TS 136 213 V12.4.0 (Feb. 2015). 227 pages.
Dementev, Oleg. "Machine-Type Communications as Part of LTE-Advanced Technology in Beyond-4G Networks." Proceeding of the 14th Conference of Fruct Association. 6 pages.
International Search Report and Written Opinion of the International Searching Authority, International Application PCT/US2015/02237.9, Intel IP Corporation, dated Jun. 20, 2015.
International Preliminary Report on Patentability dated Feb. 7, 2017, International Application PCT/US2015/022379, Intel IP Corporation. p. 1-9.
Extended European Search Report dated Feb. 7, 2018 for European Application No. 15827290.6.
3GPP TS 36.211 V16.0.0 (Dec. 2019). Release 16. 2 pages.

\* cited by examiner

PDCCH DESIGN FOR NARROWBAND DEPLOYMENT

REFERENCE TO RELATED APPLICATIONS

This application is a National Phase entry application of International Patent Application No. No. PCT/US2015/022739 filed Mar. 26, 2015, which claims priority to U.S. Provisional Application No. 62/032,436 filed Aug. 1, 2014, entitled "METHODS, APPARATUSES, AND SYSTEMS FOR MACHINE-TYPE COMMUNICATION WITH NARROWBAND DEPLOYMENT", in the name of Gang Xiong, et al. and is hereby incorporated by reference in their entirety.

FIELD

The present disclosure relates to narrowband communications, and more specifically, to a physical downlink control channel (PDCCH) design for narrowband communications, such as machine-type communications (MTC), device-to-device (D2D) communications, Internet of Things (IoT) applications, etc.

BACKGROUND

In current long term evolution (LTE) systems, the physical downlink control channel (PDCCH) is used to carry downlink control information (DCI) such as scheduling decisions and power-control commands. In particular, the DCI includes downlink scheduling assignments, uplink scheduling grants and power-control commands.

In general, several PDCCHs can be transmitted in a subframe. A cyclic redundancy check (CRC) is attached to each DCI message payload. After CRC attachment, the bits are coded with a rate-1/3 tail-biting convolutional code (TBCC) and rate-matched to fit the amount of resources used for PDCCH transmission. Subsequently, the set of coded and rate-matched bits for each PDCCH are then scrambled with a cell-specific scrambling sequence. Interleaving is applied to these symbol blocks, followed by a cell-specific cyclic shift and mapping to the available physical resource elements on the set of orthogonal frequency division multiplexing (OFDM) symbols indicated by the physical control format indicator channel (PCFICH).

Each PDCCH is transmitted using one or more Control Channel Elements (CCEs), where each CCE corresponds to nine sets of four physical resource elements (REs) known as Resource Element Groups (REGs). Four quadrature phase-shift keying (QPSK) symbols are mapped to each REG.

Given that each PDCCH supports multiple formats and the format used is a priori unknown to the terminal, the user equipment (UE) needs to monitor one or more search spaces to decode PDCCH. A search space is a set of candidate control channels formed by CCEs on a given aggregation level. In the current LTE specification, multiple aggregation levels are specified, corresponding to one, two, four, and eight CCEs. Moreover, separate UE-specific and common search spaces are defined, where a UE-specific search space is configured for each UE individually, while all UEs are informed of the extent of the common search space.

DETAILED DESCRIPTION

Figure 1:
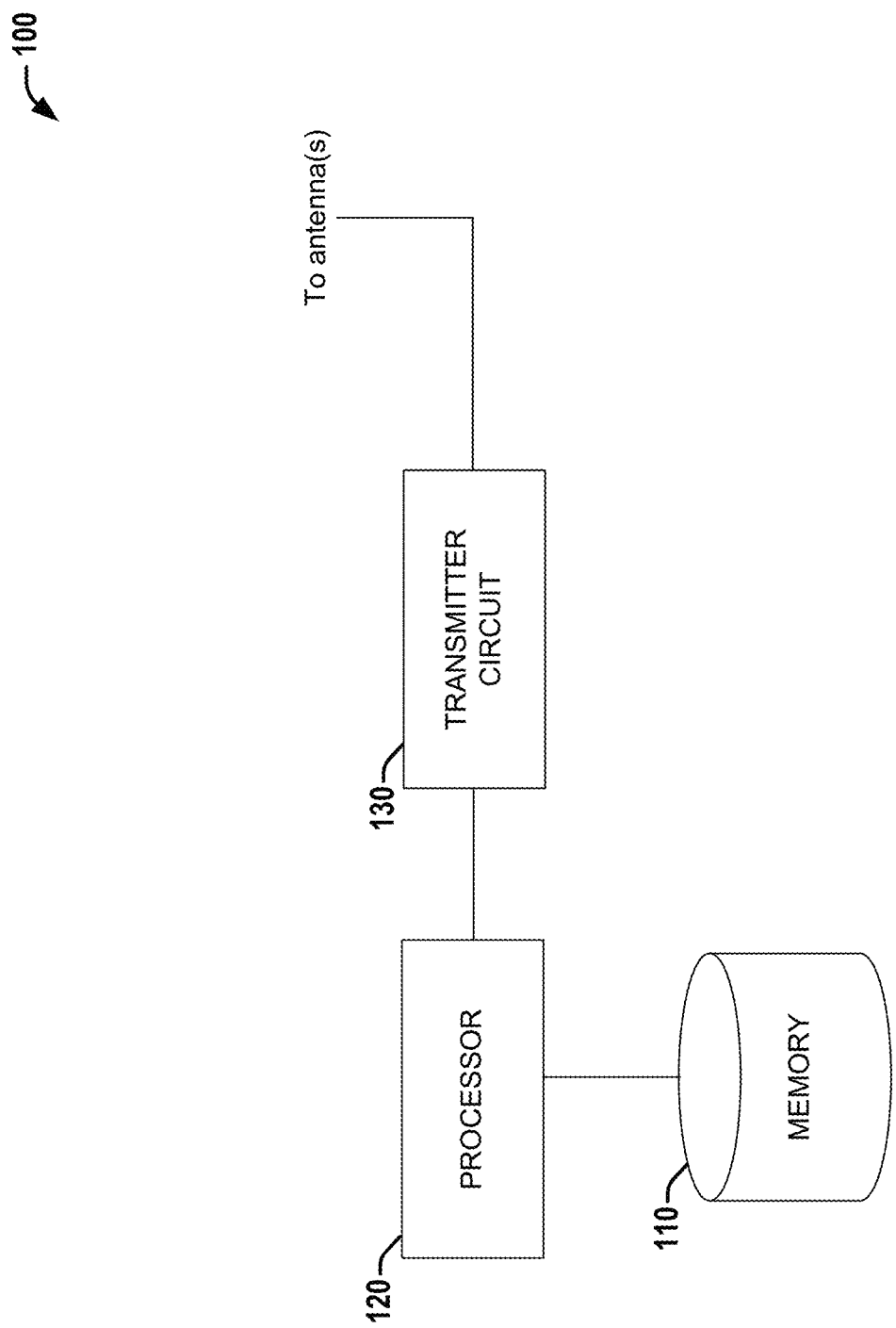
FIG. 1 is a block diagram of a system that facilitates narrowband transmission of one or more MTC-physical downlink control channel (M-PDCCH) signals from an Evolved NodeB (eNB) according to various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

Machine-Type Communication (MTC) is a promising and emerging technology with the potential to enable a ubiquitous computing environment such as the "Internet of Things (IoT)". Potential MTC based applications include smart metering, healthcare monitoring, remote security surveillance, intelligent transportation system, etc. Embodiments described herein include devices, systems, methods, apparatuses, and machine-readable media that can implement narrowband control signaling via a modified PDCCH design that can integrate the services and applications provided by MTC devices into current and next generation mobile broadband networks such as LTE and LTE-Advanced.

The existing mobile broadband networks were designed to optimize performance mainly for human type of communications and thus are not designed or optimized to meet MTC related requirements. MTC specific designs are being studied by the third generation partnership project (3GPP) Radio Access Network (RAN) working groups (WGs) for specification support in Release-12 of the LTE specifications, wherein the primary objective is to focus on lower device cost, enhanced coverage and reduced power consumption. To further reduce the cost and power consumption, embodiments described herein can further reduce the system bandwidth, for example, to around 200 KHz, which corresponds to roughly a single Physical Resource Block (PRB) of existing LTE design. This bandwidth could, in various aspects, operate in re-farmed Global System for Mobile communications (GSM) spectrum, within the guard bands of an LTE carrier, or in a dedicated spectrum.

When LTE system bandwidth is reduced to around 200 KHz, certain physical channel designs in existing LTE system cannot be reused, for example, the Synchronization Channel (SCH), Physical Broadcast Channel (PBCH), Physical Random Access Channel (PRACH), etc.

Aspects described herein can implement a new MTC Physical Downlink Control Channel (M-PDCCH) design for MTC with narrowband deployment, which can be optimized for MTC in a narrowband deployment (e.g., with bandwidth less than or equal to around 1.4 MHz, the current minimum supported LTE bandwidth), providing lowered cost and power consumption, while increasing potential coverage.

Due to the reduced bandwidth, narrowband deployments such as M-PDCCH do not have the available frequency domain resources of conventional PDCCH, and can instead utilize time domain resources as a substitute. Narrowband implementations such as device-to-device (D2D) or MTC applications generally require lower data rates per UE than human communications (e.g., voice communications) and are much less sensitive to latency, allowing for the use of time domain resources in these applications to a greater extent than practical in conventional LTE. In various narrowband deployment PDCCH designs discussed herein, a superframe structure comprising multiple subframes can be implemented that can utilize time domain resources in a manner analogous to the use of multiple simultaneous resource blocks (RBs) as a frequency domain resource in conventional LTE.

Narrowband deployment PDCCH (e.g., M-PDCCH) designs discussed herein can differ from conventional PDCCH design in multiple ways. These differences can include one or more of the use of different scheduling mechanisms for narrowband deployments, a new narrowband or MTC-specific downlink control information (M-DCI) format, different narrowband PDCCH scrambling (e.g., based on a function of the superframe index, etc.), different resource mapping for narrowband PDCCH transmissions, and a different hashing table design for the UE-specific search space for narrowband PDCCH.

Narrowband PDCCH implementations (e.g., M-PDCCH) are discussed herein in connection with various examples for the purposes of illustration. For example, although an example narrow bandwidth of 200 kHz is discussed herein, embodiments can employed in other narrowband situations, such as with a bandwidth of 400 kHz, 600 kHz, etc. Additionally, although various embodiments are discussed herein in connection with MTC, aspects discussed herein can be employed in connection with other narrowband applications, such as device-to-device (D2D) implementations, Internet of Things (IoT) applications, etc.

Referring to FIG. 1, illustrated is a block diagram of a system 100 that facilitates narrowband transmission (e.g., with a bandwidth less than or equal to a current minimum supported LTE bandwidth of 1.4 MHz, such as around 200 kHz, 400 kHz, 600 kHz, etc.) of one or more narrowband physical downlink control channel (PDCCH) signals (e.g., MTC-PDCCH (M-PDCCH) signals) from an Evolved NodeB (eNB) according to various aspects described herein. System 100 can include a memory 110, a processor 120, and a transmitter circuit 130. In various aspects, system 100 can be included within an Evolved Universal Terrestrial Radio Access Network (E-UTRAN) Node B (Evolved Node B, eNodeB, or eNB).

Memory 110 can store data, executable instructions, and/or other information employed by system 100.

Processor 120 can (e.g., by executing executable instructions stored by memory 110) generate one or more narrowband PDCCH signals (e.g., M-PDCCH signals, etc.) that include one or more of scheduling or power control information for one or more UEs associated with the eNB (e.g., MTC-enabled UEs), perform additional processing to prepare the one or more narrowband PDCCH signals for transmission and provide the one or more narrowband PDCCH signals to the transmitter circuit 130. The additional processing can include, for example, cyclic redundancy check (CRC) attachment, channel coding, rate matching, control channel element (CCE) aggregation, multiplexing, scrambling, modulation and coding (e.g., via quadrature phase-shift keying (QPSK)), interleaving, applying cyclic shift (CS), etc.

In aspects, processor 120 can determine downlink scheduling assignments and/or uplink scheduling grants for one or more UEs according to a number of scheduling options. In some aspects, a static scheduling can be implemented, such as one wherein scheduling for a UE can be predetermined based on the UE identity (ID), for example, a cell-radio network temporary identity (C-RNTI), etc., associating each UE with pre-defined uplink and/or downlink resources. In a symbol-level static scheduling example, each UE can be assigned to the symbol index equal to the remainder after division of its C-RNTI by the number of symbols per subframe (or, for example, other functions that map identities to symbol indices in a relatively evenly distributed manner). In static scheduling embodiments, narrowband PDCCH signals can include downlink control information (DCI) messages that indicate whether or not a downlink or uplink is scheduled for a given UE and pre-defined resources.

In a second scheduling option, processor 120 can employ dynamic scheduling, with assigned resources for a UE indicated in a DCI message (e.g., in an MTC-DCI (M-DCI) format for MTC embodiments, etc.). Dynamic scheduling can be implemented for multiple UEs according to either a localized resource allocation scheme or a distributed resource allocation scheme, as described in greater detail below.

In a third scheduling option, group scheduling can be employed wherein multiple UEs can be scheduled in a single group DCI message. For example, individual bits in the DCI message can indicate, for a plurality of UEs, whether each of the plurality of UEs is scheduled for downlink and/or uplink in connection with pre-defined resources associated with that UE.

Additionally, DCI messages generated by processor 120 for narrowband PDCCH embodiments discussed herein can comprise similar information as in conventional DCI messages, such as modulation and coding scheme (MCS), new data indicator (NDI), redundancy version (RV), hybrid automatic repeat request (HARQ) process number, etc. In various aspects, however, some of this information can be represented in a different manner for narrowband PDCCH embodiments. For example, the number of available MCS options and corresponding number of MCS bits can be reduced (e.g., from 5 bits to 4, 3, 2, or 1), or alternatively, can remain the same as in conventional LTE systems. In MTC embodiments, for example, smaller payload sizes and device capabilities may reduce the applicability of higher modulation orders, allowing for reduced DCI message sizes. In another example, the number of HARQ processes could be, for example, two, four, etc., thus the number of bits to indicate the HARQ process number could vary in aspects (e.g., for M bits, the HARQ process number can be the base two logarithm of M, rounded up to the nearest whole number, etc.).

In various aspects, processor 120 can employ a PDCCH format with an aggregation level as in a conventional LTE system (e.g., with 1, 2, 4, or 8 CCEs), or, in other aspects, can employ a higher aggregation level than eight (e.g., 16, 32, etc.). Higher aggregation levels can be advantageous in scenarios with UEs with coverage limitations (e.g., MTC-enabled UEs in fixed locations with poor coverage such as basements, etc.).

In some embodiments, processor 120 can perform both multiplexing and scrambling as in conventional LTE systems (e.g., using the scrambling seed defined in the current LTE specification). In other embodiments, however, processor 120 can perform scrambling based on a different scrambling seed, such as a scrambling seed that is solely a function of the cell ID, a scrambling seed that is a function of the superframe number and the cell ID, or a scrambling seed that is a function of the slot number, superframe number, and the cell ID. Processor 120 can perform additional processing (e.g. modulation, layer mapping, precoding, etc.) before providing the narrowband PDCCH signals to transmitter circuit 130.

Transmitter circuit 130 can map the one or more narrowband PDCCH signals to physical resource elements (REs). REs can be mapped to resource element groups (REGs) in increasing order of first subcarrier and then orthogonal frequency division multiplexing (OFDM) symbol. Resource mapping is discussed in greater detail below in connection with the example resource mapping shown in FIG. 7. Additionally, transmitter circuit 130 can transmit the one or more narrowband PDCCH via a selected narrowband bandwidth (e.g., which can be substantially any bandwidth less than or equal to the current minimum LTE supported bandwidth of 1.4 MHz, such as 200 kHz, etc.).

Figure 2:
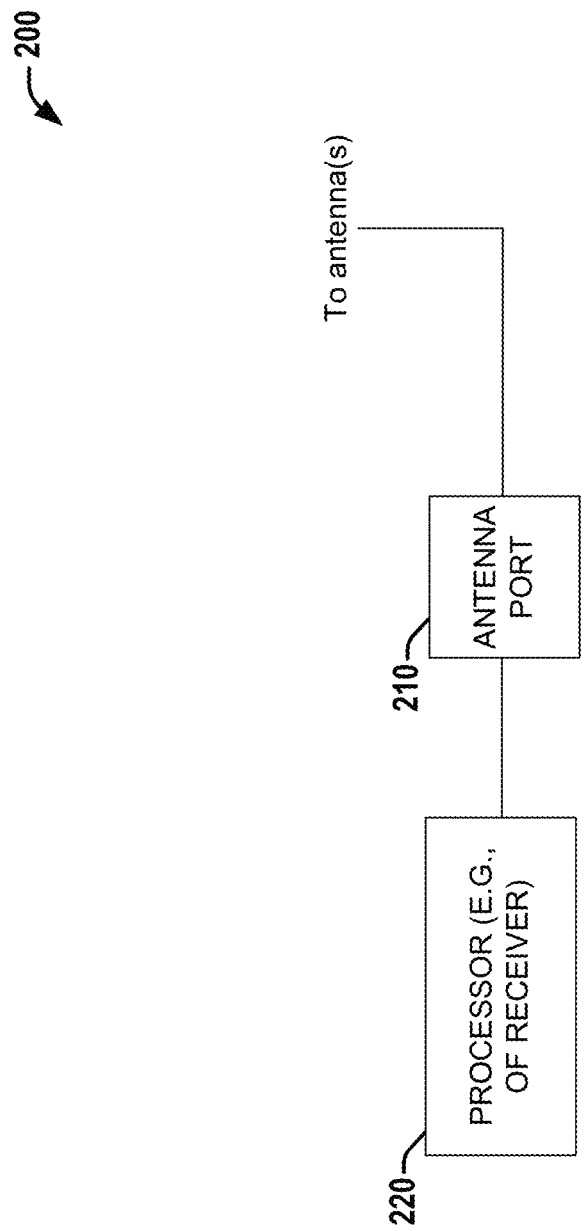
FIG. 2 is a block diagram of a system that facilitates blind decoding of a M-PDCCH signal at a user equipment (UE) according to various aspects described herein.

Referring to FIG. 2, illustrated is a block diagram of a system 200 that facilitates blind decoding of a narrowband PDCCH (e.g., M-PDCCH, etc.) signal at a user equipment (UE) according to various aspects described herein. System 200 includes an antenna port 210 and a processor 220. In various aspects, system 200 can be included within a user equipment (UE), for example, with system 200 (or portions thereof) within a receiver circuit or transceiver circuit of a UE. Additional details of a UE according to one embodiment are provided in FIG. 8 and discussed in greater detail below.

The antenna port 210 can receive various transmissions, which can include one or more transmitted narrowband PDCCH signals such as described elsewhere herein.

The processor 220 can (e.g., by executing instructions stored on a machine-readable medium, etc.) perform initial processing on the one or more narrowband PDCCH signals (e.g., predecoding, demodulation, descrambling), and can search first a common search space (CSS) and then a UE-specific search space (USS) of the narrowband PDCCH signals until a narrowband PDCCH signal associated with system 200 (e.g., associated with a UE comprising system 200) is identified. Processor 220 can identify the associated narrowband PDCCH signal by attempting blind decoding until the associated narrowband PDCCH signal is identified, for example, due to the lack of a cyclic redundancy check (CRC) error in attempted blind decoding.

In various aspects, processor 220 can search the CSS in the same manner as in conventional LTE systems. In connection with the USS, however, processor 220 can attempt blind decoding based on a hashing table that is a function of the superframe index, such as the example hashing table discussed infra.

Depending on the nature of the narrowband PDCCH signal (e.g., based on various optional aspects and embodiments discussed herein), processor 220 can identify one of downlink and/or uplink resources associated with (e.g., allocated or granted to) system 200. For example, if static scheduling is employed, processor 220 can identify pre-defined resources (e.g., a scheduled symbol index, etc.) based on an ID of the UE comprising system 200 (e.g., a C-RNTI). Alternatively, in dynamic scheduling (using either localized resource allocation or distributed resource allocation) or group scheduling aspects, processor 220 can determine the scheduled resources based on the content of a DCI message (e.g., M-DCI message) included in the associated narrowband PDCCH signal.

Additionally, as in conventional LTE systems, processor 220 can determine additional information from the associated narrowband PDCCH signal (e.g., MCS associated with data payload, power control information, HARQ process number, etc.)

Figure 3:
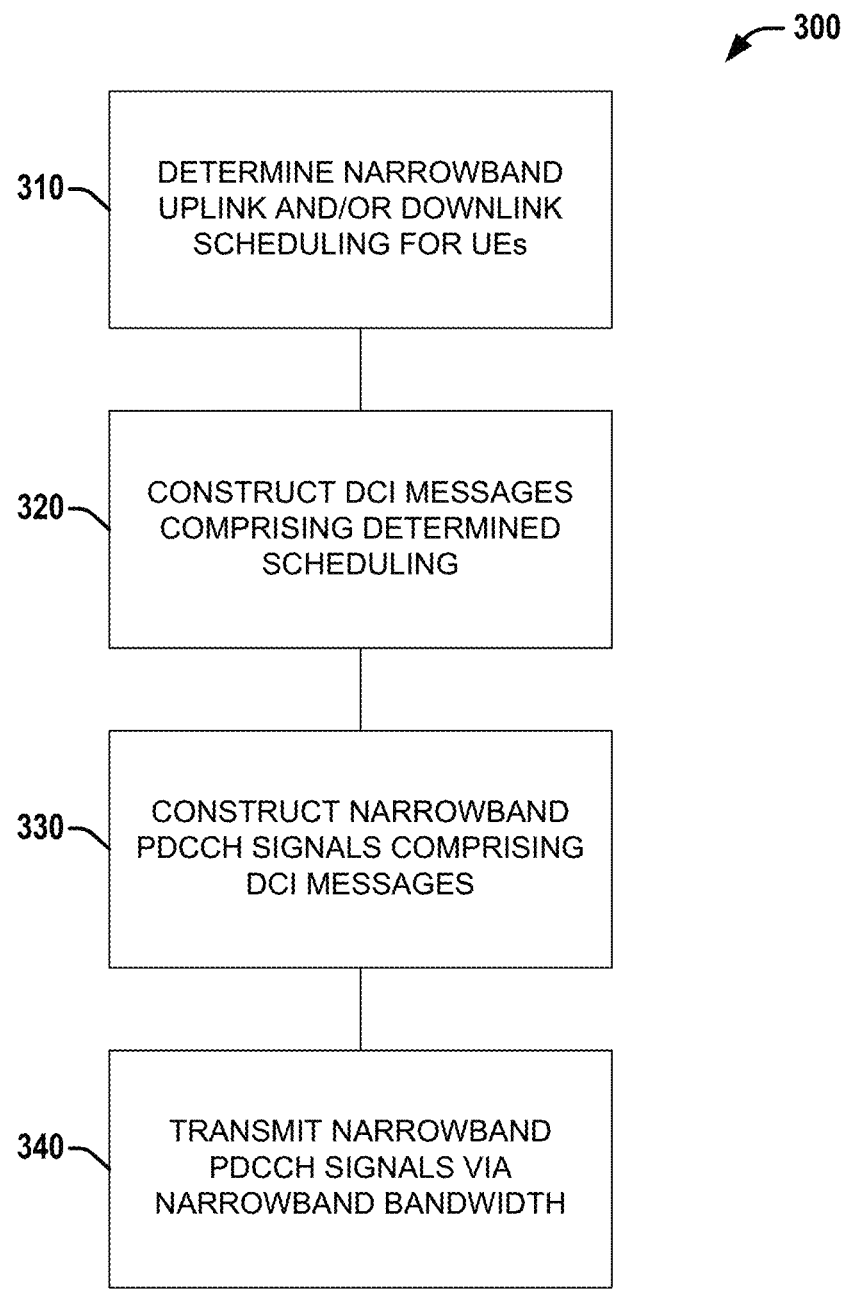
FIG. 3 is a flow diagram of a method that facilitates narrowband transmission of one or more M-PDCCH signals from an eNB according to various aspects described herein.

Referring to FIG. 3, illustrated is a flow diagram of a method 300 that facilitates narrowband transmission (e.g., with a bandwidth less than or equal to the current minimum supported LTE bandwidth of 1.4 MHz, etc.) of one or more M-PDCCH signals from an eNB according to various aspects described herein. At 310, narrowband uplink scheduling grants and downlink scheduling allocations can be determined for a plurality of UEs (e.g., devices enabled for MTC, D2D communications, etc.). As described in greater detail infra, scheduling can be determined according to any of a variety of mechanisms or schemes, such as static scheduling of resources for UEs, dynamic scheduling of resources for UEs, group scheduling, or variations thereof. At 320, narrowband DCI messages can be constructed (e.g., according to a narrowband DCI format such as described herein, e.g., M-DCI messages, etc.) that can indicate the determined scheduling as well as other information (e.g., power control information, number of HARQ processes, etc.). At 330, narrowband PDCCH signals can be constructed, which can include the DCI messages. Construction of narrowband PDCCH signals, CCE aggregation, multiplexing, and additional processing (e.g., scrambling, modulation, etc.) are discussed in greater detail infra. At 340, the narrowband PDCCH signals can be transmitted via a narrowband bandwidth, which can include mapping the PDCCH signals to physical resource element groups (REGs) as described herein (e.g., in order first of increasing (or decreasing) subcarrier and then symbol, etc.). The narrowband PDCCH signals can be transmitted such that each UE-specific search space is configured to be searched by a UE using a hashing table based on the superframe number.

Figure 4:
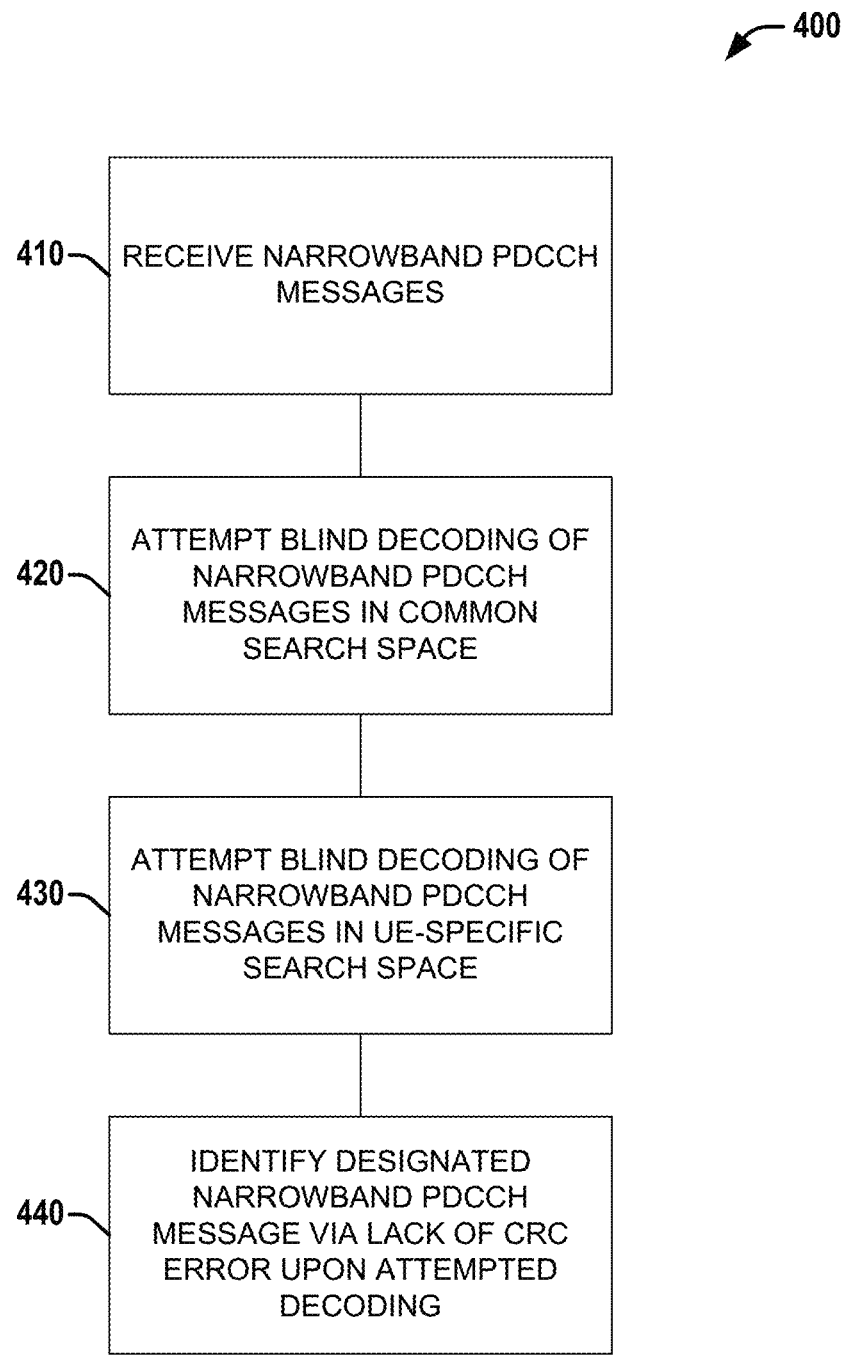
FIG. 4 is a flow diagram of a method that facilitates blind decoding of a M-PDCCH signal at a UE according to various aspects described herein.

Referring to FIG. 4, illustrated is a flow diagram of a method 400 that facilitates blind decoding of a M-PDCCH signal at a UE according to various aspects described herein. At 410, a plurality of narrowband PDCCH messages can be received at the UE. At 420 and 430, blind decoding can be attempted in a common search space of the narrowband PDCCH signals and in a UE-specific search space of the narrowband PDCCH signals. In accordance with various aspects described herein, the attempted blind decoding of the UE-specific search space can be searched via a hashing table based at least in part on the superframe number. At 440, a designated narrowband PDCCH signal can be identified through attempted blind decoding via a lack of CRC error after attempted decoding.

Figure 5:
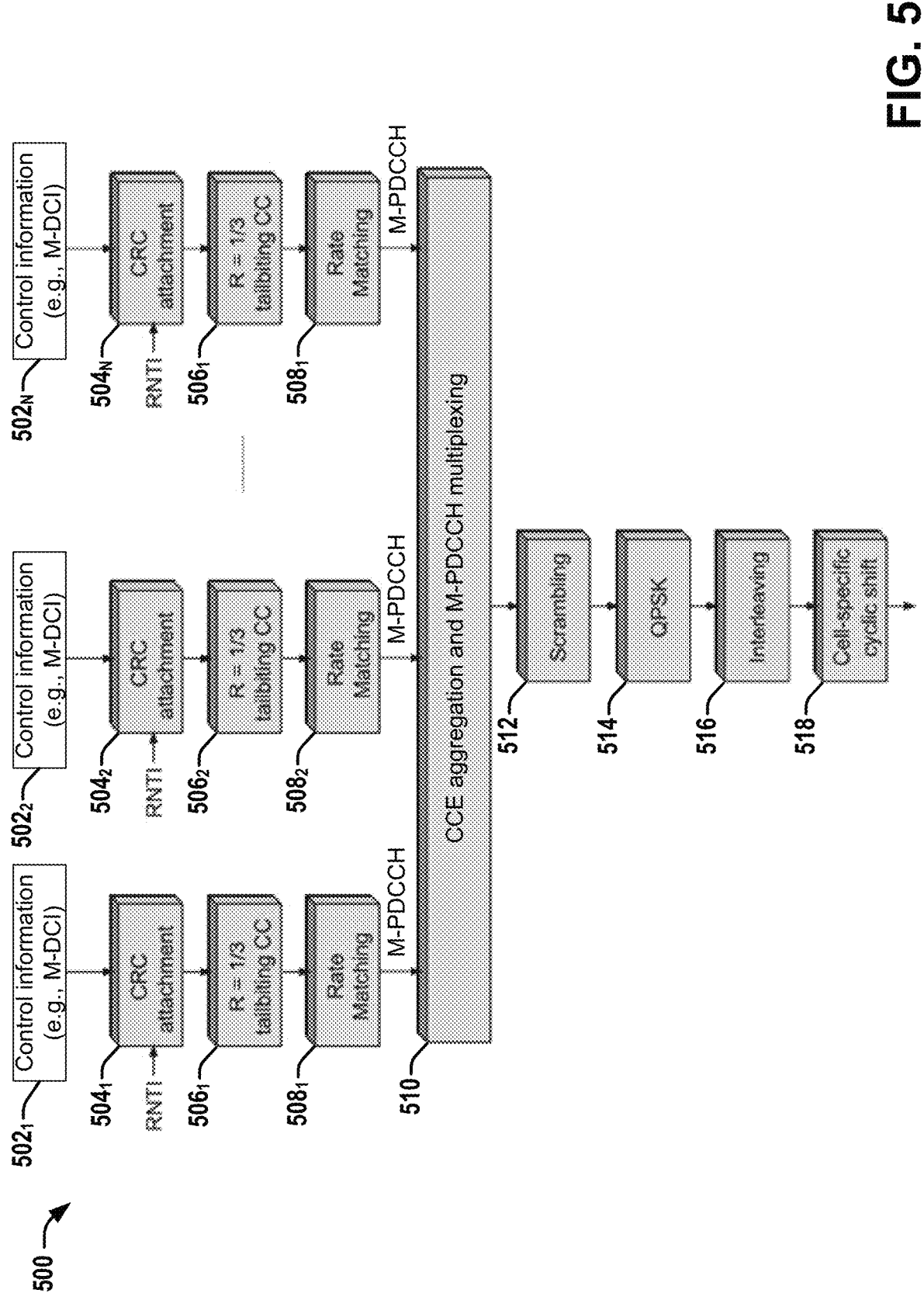
FIG. 5 is a flow diagram of an example M-PDCCH processing method illustrating differences between M-PDCCH and conventional PDCCH according to various aspects described herein.

Referring to FIG. 5, illustrated is a flow diagram of an example M-PDCCH processing method 500 illustrating differences between M-PDCCH and conventional PDCCH according to various aspects described herein. In various embodiments, machine-readable instructions can be provided that, when executed, cause an eNB or similar machine (e.g., base station, access point, etc.) to perform some or all of the acts described in connection with processing method 500. At $502_1$ through $502_N$, control information for each of N machine-type communication (MTC) enabled UEs can be generated. This can include scheduling of the N MTC UEs, which as discussed in greater detail elsewhere herein, can include static scheduling or dynamic scheduling, and can involve scheduling more than one MTC UE in the same or a common M-PDCCH region, or even in the same or a common M-PDCCH signal. Depending on the type of scheduling, an M-DCI message can be generated that can be, for example, similar in content to existing M-DCI formats, or can be smaller, such as, for example, a single bit for an MTC UE indicating whether data is to be received by the MTC UE in connection with a predefined downlink resource. In other embodiments, an M-DCI message need not be included, and the MTC UE can monitor the predefined downlink resource to determine whether data is available to be received by the MTC UE. Where an M-DCI message is included, it can be modified as described elsewhere herein, such as with a reduced number of modulation and coding scheme (MCS) bits (e.g., 3 instead of 5), with an updated hybrid automatic repeat request (HARQ) process number, etc.

At $504_1$-$504_N$, $506_1$-$3506_N$, and $508_1$-$3508_N$, cyclic redundancy check (CRC) insertion, channel coding, and rate matching can be similar to conventional LTE, to construct M-PDCCH signals based on the scheduling information and any additional information (e.g., power control, etc.), for example, as included in the M-DCI message(s). At 510, CCE aggregation and multiplexing can be applied to the M-PDCCH signals, for example, in a similar manner to conventional LTE. Alternatively, higher aggregation levels can be employed, such as increasing the number of control channel elements (CCEs) to 16, etc.

At 512, scrambling can either be the same as in conventional LTE, or it can employ a different scrambling seed. For example, instead of the scrambling seed being a function of the slot number and the cell ID, as in conventional LTE, the scrambling seed could be solely a function of the cell ID. Alternatively, the scrambling seed could be a function of the superframe number, such as a function of the cell ID and superframe number, or the cell ID, slot number, and superframe number.

At 3514, 516, and 518, modulation, interleaving, and cyclic shift application can be as in conventional LTE.

Another difference from PDCCH processing in conventional LTE, resource elements (REs) can be mapped to resource element groups (REGs) not used for reference signals first by increasing order of subcarrier and then by increasing order of orthogonal frequency division multiplexing (OFDM) symbol.

Additionally, blind decoding of candidate control channels for narrowband PDCCH can be similar to conventional LTE, although in connection with the UE-specific search space, a different hashing table, based on the superframe number, can be employed.

The following is a more detailed overview of an example structure of a narrowband PDCCH design in connection with a MTC implementation of a narrowband PDCCH (M-PDCCH).

Scheduling for MTC Devices

Several options can be considered for the scheduling of the MTC devices with narrowband deployment.

In a first scheduling option, a predetermined scheduling mechanism can be employed. For example, the scheduled symbol/slot/subframe/subcarrier/PRB index can be predetermined by the UE ID. In one example, if symbol level scheduling is supported for MTC with narrowband deployment, the scheduled symbol index for one UE can be given as $I_{sym}=\text{mod}(\text{C-RNTI}, 14)$ for normal cyclic prefix (CP) mode and $I_{sym}=\text{mod}(\text{C-RNTI}, 12)$ for extended CP mode, where C-RNTI is the cell-radio network temporary identity.

In a second scheduling option, a dynamic scheduling mechanism for individual MTC devices can be applied. For example, M-PDCCH can schedule the time and frequency locations for the DL and UL transmission for a single MTC device. In this situation, the resource assignment (i.e., symbol/slot/subframe/subcarrier/PRB index for M-PDSCH/M-PUSCH transmission(s)) can be indicated in the MTC Downlink Control Information (M-DCI) format in the M-PDCCH. Further, localized and distributed resource allocation can be supported for M-PDSCH/M-PUSCH, where in the case of distributed resource allocation, the benefits of time diversity gain may be exploited.

Figure 6:
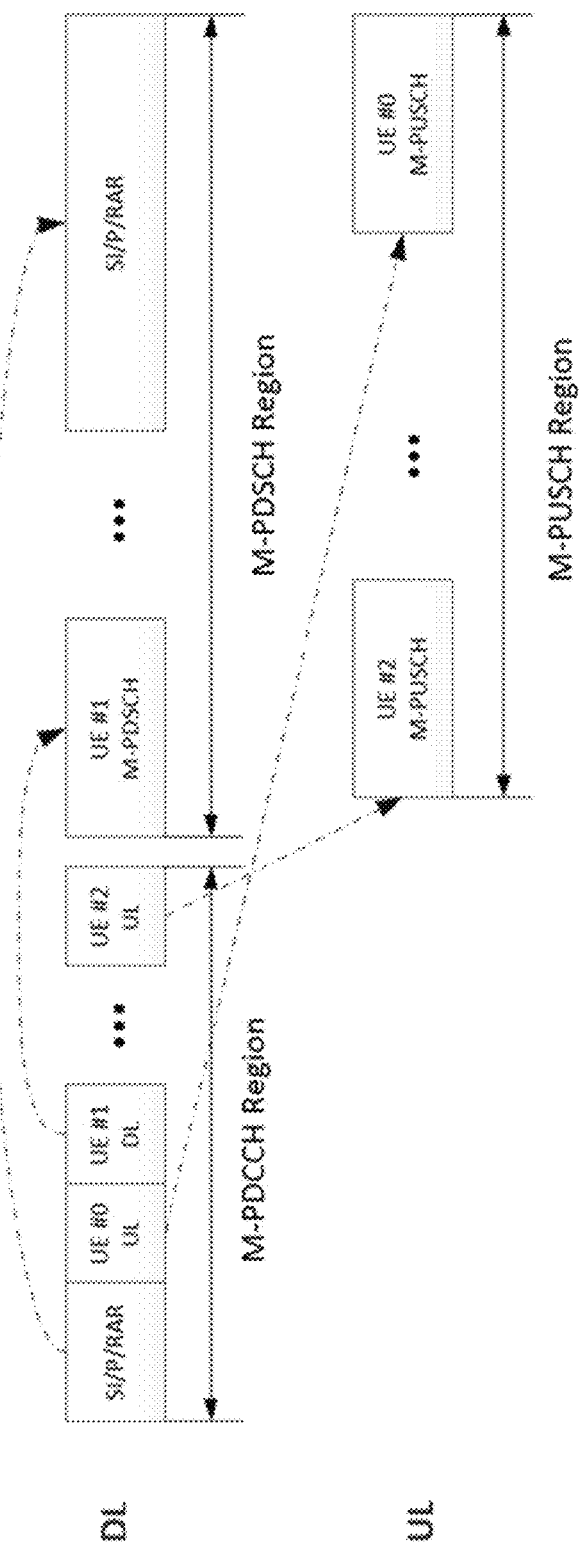
FIG. 6 is a diagram illustrating an example of dynamic M-PDCCH scheduling according to various aspects described herein.

Referring to FIG. 6, illustrated is a diagram illustrating an example of dynamic M-PDCCH scheduling according to various aspects described herein. As shown in FIG. 6, scheduling for multiple UEs and system information/paging/random access response can be multiplexed in the same M-PDCCH region. In one example of localized resource allocation, M-PDSCH for UE#0 can be scheduled in subframe #0-#4, while M-PDSCH for UE#1 can be scheduled in subframe #5-#9. In an example of distributed resource allocation, M-PDSCH for UE#0 can be scheduled in subframe #0, #2, #4, #6, #8 while M-PDSCH for UE#1 can be scheduled in subframe #1, #3, #5, #7, #9. In embodiments supporting both, the indication for localized or distributed resource allocation can be signaled in the M-DCI format. In addition, the HARQ process number, redundancy version (RV) and new data indicator (NDI) can be indicated in the M-DCI format as in the existing LTE specification.

In a third scheduling option, one M-PDCCH can be used to schedule multiple MTC devices. For example, a single M-DCI message can contain an on/off pattern and 1 bit (0 or 1) can indicate whether the corresponding MTC device is scheduled in the predetermined resource. This group scheduling mechanism is similar to the existing DCI format 3 and 3A, where multiple UEs within a group are configured by higher layers. Each bit position can correspond to the scheduled status for each configured MTC device. Additionally, the scheduled resource can be determined by the ordering of the configured MTC UEs. For example, 3 MTC UEs (UE #0, #1 and #2) within one group can be scheduled with status [1 1 1], and if symbol level scheduling is supported, the symbol indexes for UEs #0, #1, and #2 can be symbols #0, #1, and #2, respectively. Optionally, for any of these scheduling options, in a manner similar to Semi-Persistent Scheduling (SPS) based scheduling, the assigned M-DCI could be retained until deactivated, for example, through explicit deactivation, expiration after a certain period of time, etc.

New PDCCH (M-PDCCH) Design with Narrowband Deployment

As explained supra, because of the constraints of a narrowband deployment such as a 200 kHz bandwidth, the existing PDCCH design cannot be reused. However, the M-PDCCH design discussed herein can be extended to narrowband scenarios other than 200 kHz MTC implementations, such as other narrow bandwidths less than the current minimum supported LTE bandwidth of 1.4 MHz (e.g., 400 kHz, 600 kHz, etc.), and to other narrowband applications, such as D2D applications, the Internet of Things (IoT), etc.

M-DCI Format

To support MTC with narrowband deployment, a new MTC DCI (M-DCI) format can be specified. More specifically, the downlink scheduling assignments and uplink scheduling grants for MTC with narrowband deployment can be included in the M-DCI format. Additionally, zero-padding bits can be appended to ensure the same payload size of downlink assignment and uplink grants in the M-DCI formats.

Most of the contents in the existing DCI formats can be reused for M-DCI. However, to support MTC with narrowband deployment, certain design changes can be implemented. For downlink assignment and uplink grant, the resource allocation for M-PDSCH and M-PUSCH can be updated. The resource allocation contains the information for time/frequency locations for M-PDSCH transmission, e.g., symbol, slot, subframes, PRB, subcarrier, etc. As discussed supra in connection with scheduling, in the case when localized and distributed resource allocation schemes are supported for MTC with narrowband deployment, the indication for localized or distributed resource allocation can be signaled in the M-DCI format.

Additionally, in the downlink assignment, the HARQ process number can be updated. The number of bits in this field depends on the total number of HARQ processes. In various narrowband aspects, the HARQ process and the number of HARQ processes can vary from conventional LTE. For example, in various narrowband implementations, the number of HARQ processes can be any positive integer M (e.g., 2, 4, etc.). When the total number of HARQ processes is M, the number of bits included in M-DCI for the HARQ process number can be $X_1 = \log_2(M)$.

To further reduce the signaling overhead, the number of modulation-and-coding scheme (MCS) bits in the M-DCI message can be reduced. For example, in one embodiment, the existing MCS table in the current LTE specification (3GPP Technical Specification 36.213) can be reused, i.e., $X_2=5$. In another embodiment, given than the transport-block size for MTC data transmission with narrowband deployment is limited and higher-order modulation may not be supported, the number of bits for MCS can be further reduced, for example, $X_2=3$ (or 1, 2, or 4).

PDCCH Channel Coding

To minimize the impact on the LTE specification and the cost of implementation, same CRC insertion procedure (including CRC mask with RNTI), channel coding and rate matching as in the existing LTE specification can be applied for M-PDCCH.

In the current LTE system, 4 PDCCH formats are supported. To support MTC with narrowband deployment, more M-PDCCH formats with higher aggregation levels can be considered, which can help to improve the performance for coverage limited MTC devices. For example, the number of CCEs can be increased to 16, or potentially higher.

PDCCH Multiplexing and Scrambling

Multiplexing after channel coding can be implemented the same as in the existing LTE specifications.

In some embodiments, the same scrambling seed as defined in the LTE specification can be reused, as in equation 1:

$$c_{init} = \lfloor n_s/2 \rfloor 2^9 + N_{ID}^{cell}, \quad (1)$$

where $n_s$ is the slot number and $N_{ID}^{cell}$ is the cell ID.

In other embodiments, the scrambling seed can be defined as a function of the cell ID only. For example, the scrambling seed can be given as in equation 2:

$$c_{init} = N_{ID}^{cell}. \quad (2)$$

In another set of embodiments, the scrambling seed can be defined as a function of the cell ID and super-frame number, per equation 3:

$$c_{init} = f(n_{superframe}, N_{ID}^{cell}), \quad (3)$$

where $n_{superframe}$ is the super-frame number. For example, the scrambling seed can be as in equation 4:

$$c_{init} = n_{superframe} \cdot 2^9 + N_{ID}^{cell}. \quad (4)$$

In further embodiments, the scrambling seed can be defined as a function of the slot number ($n_s$), the cell ID and super-frame number. For instance, it can be as in equation 5:

$$c_{init} = \lfloor n_s/2 \rfloor \cdot n_{superframe} \cdot 2^9 + N_{ID}^{cell}. \quad (5)$$

Modulation, Layer Mapping and Precoding

The same modulation, layer mapping and precoding as in the existing LTE specification can be reused for M-PDCCH, which can simplify implementation.

M-PDCCH Resource Mapping

Figure 7:
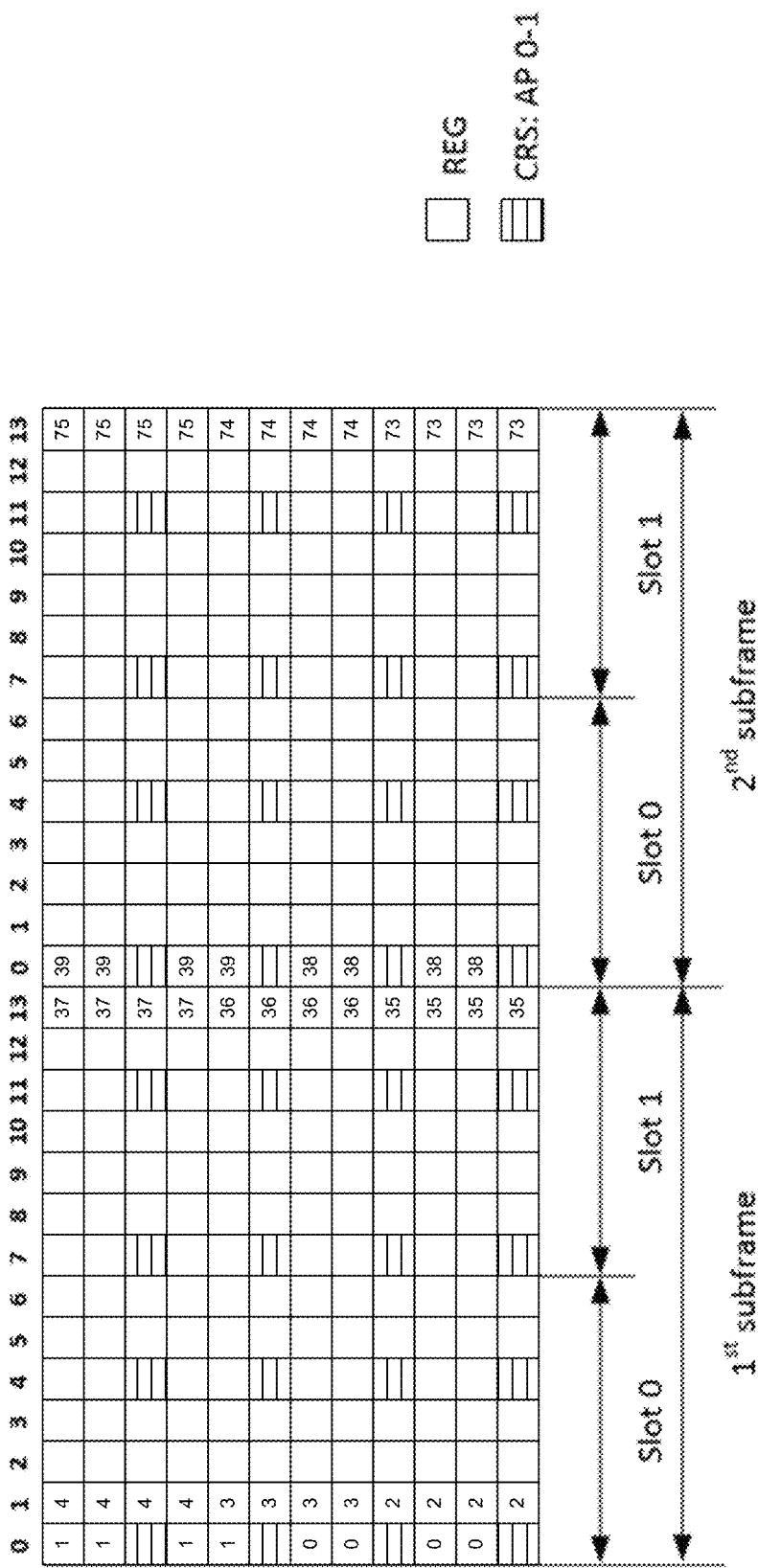
FIG. 7 is a time-frequency diagram indicating an example resource mapping of MTC-resource element groups (M-REGs) according to various aspects described herein.

M-REG can be defined and extended from the existing resource element group (REG) for one or more subframes for control channel design. For example, four resource elements (REs) can be mapped to the MTC resource element group (M-REG) not used for reference signals (e.g. Cell-specific Reference Signal (CRS) or other MTC related reference signals that may be applicable) in the increasing order of first subcarrier and then OFDM symbol. FIG. 7 illustrates a time-frequency diagram indicating an example resource mapping of MTC-resource element groups (M-REGs) according to various aspects described herein. In the examples shown in FIG. 7 and discussed herein, the M-REG mapping rule is designed based on the CRS pattern, but it can be easily extended to other reference signal patterns, for example, a dedicated MTC downlink (DL) reference signal (M-RS).

FIG. 7 illustrates the M-REG resource mapping for 2 subframes with 1/2 antenna ports in the case of normal CP. The same design principle can be applied for 4 antenna ports and extended CP. $N_{REG}$ can be defined as the number of M-REGs in one subframe. According to the M-REG resource mapping pattern, in the normal CP case, $N_{REG}$=38 for 1/2 antenna ports and $N_{REG}$=36 for 4 antenna ports. In the extended CP case, $N_{REG}$=32 for 1/2 antenna ports and $N_{REG}$=30 for 4 antenna ports.

For the $K^{th}$ subframe, the starting M-REG index is $(K-1) \cdot N_{REG}$, and the last M-REG index is $K \cdot N_{REG}-1$. For example, as shown in FIG. 7, the starting and last M-REG index for the $2^{nd}$ subframe is 38 and 75 with 1/2 antenna ports in the case of normal CP, respectively.

In some embodiments, the symbol quadruplet in the M-PDCCH transmission can be mapped to the M-REG in increasing order. In one example embodiment, the M-PDCCH resource mapping can be defined as follows. The mapping of the block of quadruplets $\overline{w}^{(p)}(0), \ldots, \overline{w}^{(p)}(M_{quad}-1)$ to resource elements for M-PDCCH transmission can be defined as: (1) Let $n_c$ denote the number of M-REGs not assigned to M-PCFICH and M-PHICH in the control region; (2) Number the M-REG not assigned to M-PCFICH and M-PHICH from 0 to $n_c-1$, starting from the M-REG with the lowest frequency-domain index and then the time domain index; (3) Initialize k=0 (the M-REG index); (4) Map the symbol quadruplet $\overline{w}^{(p)}(k)$ to the M-REG represented by the M-REG index k; (5) Increase k by 1; and (6) Repeat 4 and 5 until all M-PDCCH symbol quadruplets have been assigned.

Hashing Table for M-PDCCH Search Space

In the current LTE specification, the UE needs to perform blind decoding on a set of candidate control channels, namely those in the common search space (CSS) and UE specific search space (USS). This same mechanism can be applied for the M-PDCCH design to minimize the specification impact and implementation cost. However, the aggregation level and the number of M-PDCCH candidates can be modified for M-PDCCH in order to reduce the power consumption of MTC devices.

Unlike the current LTE specification, cross-subframe scheduling is employed for MTC systems with narrowband deployment. To avoid excessive blind decoding attempts for M-PDCCH, the starting subframe of M-PDCCH is limited to a subset of the subframes. The configuration regarding the periodicity and offset of M-PDCCH transmission can be predefined or configured by the eNB in a device-specific or cell-specific manner.

In aspects, the same hashing table as in the current LTE specification can be reused for the common search space design for M-PDCCH transmission. However, for the USS, the hashing table can be changed to support the super-frame structure for MTC with narrowband deployment. The USS design for M-PDCCH can be as follows. For the UE-specific search space $S_k^{(L)}$ at aggregation level L, the variable $Y_k$ can be defined by equation 6:

$$Y_k = (A \cdot Y_{k-1}) \bmod D. \quad (6)$$

where $Y_{-1}=n_{RNTI} \neq 0$, A=39827, D=65537 and $k=n_{superframe}$, where $n_{superframe}$ is the super-frame number.

Figure 8:
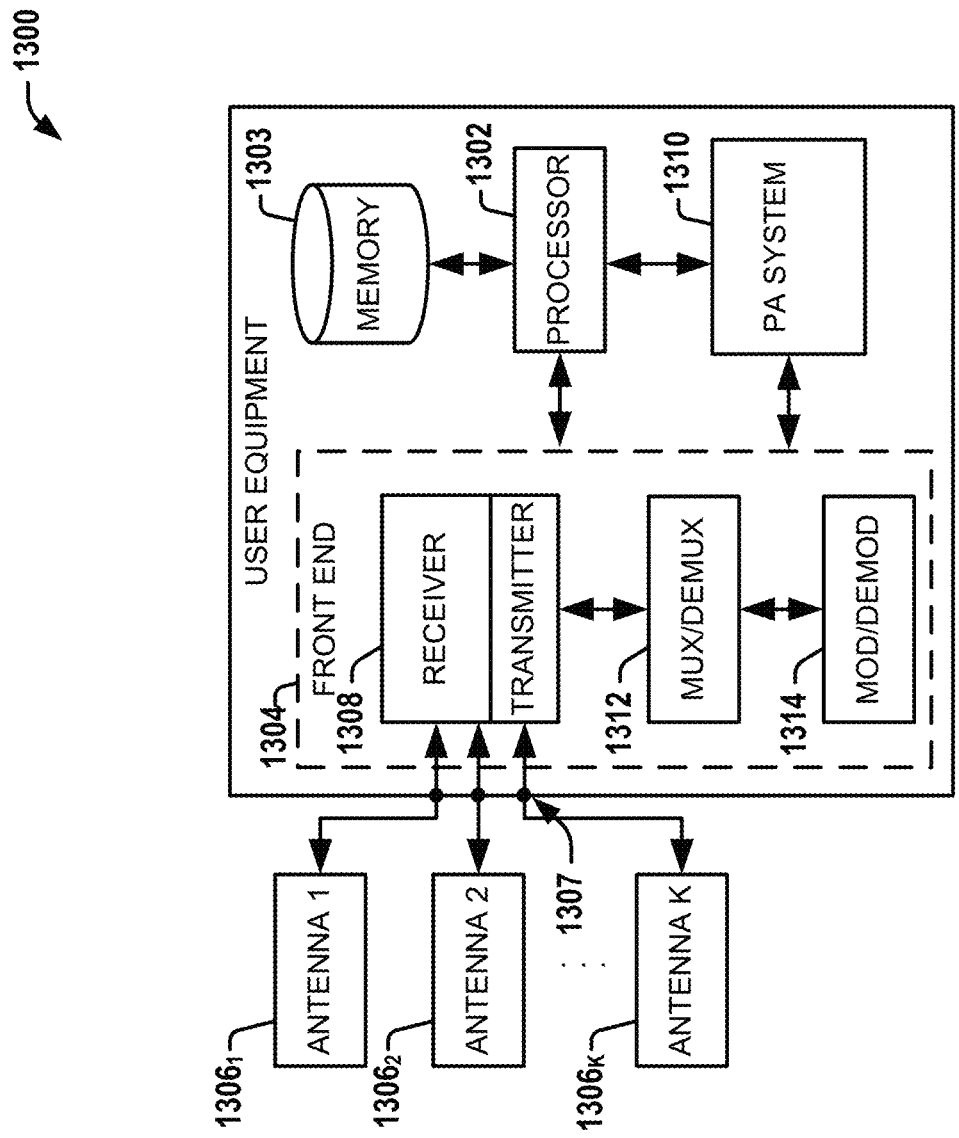
FIG. 8 is a block diagram illustrating an example UE useable in connection with various aspects described herein.

Referring to FIG. 8, illustrated is an exemplary user equipment or mobile communication device 800 that can be utilized with one or more aspects of the systems, methods, or devices facilitating NOMA communication described herein according to various aspects. The user equipment 800, for example, comprises a digital baseband processor 802 that can be coupled to a data store or memory 803, a front end 804 (e.g., an RF front end, an acoustic front end, or the other like front end) and a plurality of antenna ports 807 for connecting to a plurality of antennas $806_1$ to $806_k$ (k being a positive integer). The antennas $806_1$ to $806_k$ can receive and transmit signals to and from one or more wireless devices such as access points, access terminals, wireless ports, routers and so forth, which can operate within a radio access network or other communication network generated via a network device. The user equipment 800 can be a radio frequency (RF) device for communicating RF signals, an acoustic device for communicating acoustic signals, or any other signal communication device, such as a computer, a personal digital assistant, a mobile phone or smart phone, a tablet PC, a modem, a notebook, a router, a switch, a repeater, a PC, network device, base station or a like device that can operate to communicate with a network or other device according to one or more different communication protocols or standards.

The front end 804 can include a communication platform, which comprises electronic components and associated circuitry that provide for processing, manipulation or shaping of the received or transmitted signals via one or more receivers or transmitters 808, a mux/demux component 812, and a mod/demod component 814. The front end 804, for example, is coupled to the digital baseband processor 802 and the set of antenna ports 807, in which the set of antennas $806_1$ to $806_k$ can be part of the front end. At least one receiver 808 can facilitate blind decoding of a M-PDCCH signal in accordance with aspects described herein.

The user equipment 800 can also include a processor 802 or a controller that can operate to provide or control one or more components of the user equipment 800. For example, the processor 802 can confer functionality, at least in part, to substantially any electronic component within the user equipment 800, in accordance with aspects of the disclosure. As an example, the processor 802 can be configured to execute, at least in part, executable instructions that facilitate blind decoding of a M-PDCCH signal in conjunction with at least one receiver 808, and in accordance with aspects described herein.

The processor 802 can operate to enable the user equipment 800 to process data (e.g., symbols, bits, or chips) for multiplexing/demultiplexing with the mux/demux component 812, or modulation/demodulation via the mod/demod component 814, such as implementing direct and inverse fast Fourier transforms, selection of modulation rates, selection of data packet formats, inter-packet times, etc. Memory 803 can store data structures (e.g., metadata), code structure(s) (e.g., modules, objects, classes, procedures, or the like) or instructions, network or device information such as policies and specifications, attachment protocols, code sequences for scrambling, spreading and pilot (e.g., reference signal(s)) transmission, frequency offsets, cell IDs, and other data for detecting and identifying various characteristics related to RF input signals, a power output or other signal components during power generation.

The processor 802 is functionally and/or communicatively coupled (e.g., through a memory bus) to memory 803 in order to store or retrieve information necessary to operate and confer functionality, at least in part, to communication platform or front end 804 including the receiver 808, and the PA system 810. While the components in FIG. 8 are illustrated in the context of a user equipment, such illustration is not limited to user equipment but also extends to other wireless communication devices, such as base station (e.g., eNodeB), small cell, femtocell, macro cell, microcell, etc.

Examples herein can include subject matter such as a method, means for performing acts or blocks of the method, at least one machine-readable medium including executable instructions that, when performed by a machine (e.g., a processor with memory or the like) cause the machine to perform acts of the method or of an apparatus or system for concurrent communication using multiple communication technologies according to embodiments and examples described.

Example 1 is an Evolved NodeB (eNB), comprising a memory, a processor, and a transmitter circuit. The memory stores executable instructions. The processor is configured to execute the executable instructions to at least: determine at least one of downlink or uplink scheduling for one or more machine-type communication (MTC)-enabled user equipments (UEs); generate, based at least in part on the determined scheduling, one or more MTC-physical downlink control channel (PDCCH) signals (M-PDCCH signals) associated with the one or more MTC-enabled UEs; and perform channel coding, multiplexing, and scrambling of the generated one or more M-PDCCH signals. The transmitter circuit is configured to map the one or more M-PDCCH signals to resource element groups (REGs) in order of increasing subcarrier followed by orthogonal frequency division multiplexing (OFDM) symbol and to transmit the one or more M-PDCCH signals via a narrowband bandwidth of less than 1.4 MHz.

Example 2 includes the subject matter of example 1, wherein the at least one of the downlink or uplink scheduling is determined based on association of identities of the one or more MTC-enabled UEs with pre-defined resources.

Example 3 includes the subject matter of example 1, wherein the one or more M-PDCCH signals comprise MTC downlink control information (M-DCI) messages that indicate, for each MTC-enabled UE, whether a downlink transmission or an uplink transmission is scheduled for resources associated with that MTC-enabled UE.

Example 4 includes the subject matter of example 1, wherein one of the M-PDCCH signals comprises an MTC downlink control information (M-DCI) message that indicates, for each of a plurality of the MTC-enabled UEs, whether a downlink transmission or an uplink transmission is scheduled for resources associated with that MTC-enabled UE.

Example 5 includes the subject matter of example 1, wherein the one or more M-PDCCH signals comprise MTC downlink control information (M-DCI) messages, wherein each M-DCI message comprises three bits that indicate a designated modulation and coding scheme (MCS).

Example 6 includes the subject matter of any of examples 1-5, including or omitting optional features, wherein performing scrambling of the one or more M-PDCCH signals comprises performing scrambling based on a scrambling seed that is a function of at least a superframe number, a slot number and a cell identity.

Example 7 includes the subject matter of example 1, wherein performing scrambling of the one or more M-PDCCH signals comprises performing scrambling based on a scrambling seed that is solely a function of a cell identity.

Example 8 includes the subject matter of example 1, wherein performing scrambling of the one or more M-PDCCH signals comprises performing scrambling based on a scrambling seed that is a function of at least a superframe number, a slot number and a cell identity.

Example 9 includes the subject matter of any of examples 1-4, including or omitting optional features, wherein the one or more M-PDCCH signals comprise MTC downlink control information (M-DCI) messages, wherein each M-DCI message comprises three bits that indicate a designated modulation and coding scheme (MCS).

Example 10 includes the subject matter of any of examples 1-5, including or omitting optional features, wherein performing scrambling of the one or more M-PDCCH signals comprises performing scrambling based on a scrambling seed that is solely a function of a cell identity.

Example 11 is a non-transitory machine readable medium comprising instructions that, when executed, cause an Evolved NodeB (eNB) to: schedule a plurality of machine-type communication (MTC) devices for one or more of an uplink grant or a downlink allocation; generate at least one MTC downlink control information (M-DCI) message associated with the plurality of MTC devices; construct one or more MTC-physical downlink control channel (PDCCH) signals (M-PDCCH signals) based on the at least one M-DCI message; and transmit the one or more M-PDCCH signals in one or more M-PDCCH regions via a narrowband transmission mode.

Example 12 includes the subject matter of example 11, wherein the narrowband transmission mode comprises narrowband transmission via a bandwidth of 1.4 MHz or less.

Example 13 includes the subject matter of example 11, wherein an aggregation level of a first M-PDCCH signal of the one or more M-PDCCH signals is greater than eight.

Example 14 includes the subject matter of example 11, wherein a first M-DCI message of the at least one M-DCI message indicates a designated modulation and coding scheme (MCS) via less than five bits.

Example 15 includes the subject matter of example 11, wherein the instructions, when executed, further cause the eNB to multiplex and scramble the one or more M-PDCCH signals based on a scrambling seed based at least in part on a superframe number.

Example 16 includes the subject matter of any of examples 11-15, including or omitting optional features, wherein each of the at least one M-DCI messages indicates a hybrid automatic repeat request (HARQ) process number via a number of bits based on a base two logarithm of the HARQ process number.

Example 17 includes the subject matter of example 11, wherein a first MTC device of the MTC devices is scheduled via a localized resource allocation scheme.

Example 18 includes the subject matter of example 11, wherein a first MTC device of the MTC devices is scheduled via a distributed resource allocation scheme.

Example 19 includes the subject matter of example 11, wherein a first M-PDCCH signal of the one or more M-PDCCH signals indicates whether an uplink transmission or downlink transmission is scheduled for each of a plurality of the MTC devices.

Example 20 includes the subject matter of example 11, wherein a user equipment (UE)-specific search space for transmission of the one or more M-PDCCH signals is determined in accordance with a superframe number.

Example 21 includes the subject matter of example 11, wherein each of the at least one M-DCI messages indicates a hybrid automatic repeat request (HARQ) process number via a number of bits based on a base two logarithm of the HARQ process number.

Example 22 includes the subject matter of any of examples 11-12, including or omitting optional features, wherein a first M-DCI message of the at least one M-DCI message indicates a designated modulation and coding scheme (MCS) via less than five bits.

Example 23 includes the subject matter of any of examples 11-12 or 22, including or omitting optional features, wherein the instructions, when executed, further cause the eNB to multiplex and scramble the one or more M-PDCCH signals based on a scrambling seed based at least in part on a superframe number.

Example 24 includes the subject matter of any of examples 11-12 or 22-23, including or omitting optional features, wherein each of the at least one M-DCI messages indicates a hybrid automatic repeat request (HARQ) process number via a number of bits based on a base two logarithm of the HARQ process number.

Example 25 includes the subject matter of any of examples 11-12 or 22-24, including or omitting optional features, wherein a first MTC device of the MTC devices is scheduled via a localized resource allocation scheme.

Example 26 includes the subject matter of any of examples 11-12 or 22-24, including or omitting optional features, wherein a first MTC device of the MTC devices is scheduled via a distributed resource allocation scheme.

Example 27 includes the subject matter of example 11-12 or 22-26, including or omitting optional features, wherein a user equipment (UE)-specific search space for transmission of the one or more M-PDCCH signals is determined in accordance with a superframe number.

Example 28 is a user equipment (UE), comprising an antenna port and a processor. The antenna port is configured to receive a narrowband transmission comprising a set of two or more machine-type communication (MTC)-physical downlink control channel (PDCCH) signals (M-PDCCH signals). The processor is operably coupled to the antenna port and configured to: predecode, demodulate, and descramble the plurality of M-PDCCH signals; attempt blind decoding on a first subset of the plurality of M-PDCCH signals associated with a common search space (CSS), wherein at most one M-PDCCH signal of the first subset of M-PDCCH signals is successfully blind decoded; attempt blind decoding of a second subset of the plurality of M-PDCCH signals associated with a UE-specific search space (USS), wherein the attempted blind decoding of the second subset is via a hashing table that is based at least in part on a superframe index; and identify a M-PDCCH signal associated with the UE among the first subset or the second subset upon successful decoding of the M-PDCCH signal associated with the UE as determined by a lack of a cyclic redundancy check (CRC) error after blind decoding of the M-PDCCH signal associated with the UE.

Example 29 includes the subject matter of example 28, wherein the UE is associated with a cell-radio network temporary identity (C-RNTI), and wherein the processor is configured to determine a scheduled symbol index associated with the UE based at least in part on the C-RNTI.

Example 30 includes the subject matter of example 28, wherein the processor is further configured to determine at least one of a scheduled downlink allocation or a scheduled uplink grant based at least in part on the M-PDCCH signal associated with the UE.

Example 31 includes the subject matter of example 30, wherein the M-PDCCH signal associated with the UE comprises a MTC downlink control information (M-DCI) message, and wherein the processor is configured to determine the at least one of the scheduled downlink allocation or the scheduled uplink grant based at least in part on the M-DCI message.

Example 32 includes the subject matter of example 31, wherein the M-DCI message indicates the at least one of the scheduled downlink allocation or the scheduled uplink grant via a bit associated with the UE and a predetermined resource.

Example 33 includes the subject matter of example 31, wherein the M-DCI message dynamically indicates the at least one of the scheduled downlink allocation or the scheduled uplink grant via a localized resource allocation scheme.

Example 34 includes the subject matter of example 31, wherein the M-DCI message dynamically indicates the at least one of the scheduled downlink allocation or the scheduled uplink grant via a distributed resource allocation scheme.

Example 35 is an Evolved NodeB (eNB), comprising means for storing executable instructions, means for executing, and means for transmitting. The means for executing execute the executable instructions to at least determine at least one of downlink or uplink scheduling for one or more machine-type communication (MTC)-enabled user equipments (UEs); generate, based at least in part on the determined scheduling, one or more MTC-physical downlink control channel (PDCCH) signals (M-PDCCH signals) associated with the one or more MTC-enabled UEs; and perform channel coding, multiplexing, and scrambling of the generated one or more M-PDCCH signals. The means for transmitting is configured to map the one or more M-PDCCH signals to resource element groups (REGs) in order of increasing subcarrier followed by orthogonal frequency division multiplexing (OFDM) symbol and to transmit the one or more M-PDCCH signals via a narrowband bandwidth of less than 1.4 MHz.

Example 36 is a user equipment (UE), comprising means for receiving and means for processing. The means for receiving receive a narrowband transmission comprising a set of two or more machine-type communication (MTC)-physical downlink control channel (PDCCH) signals (M-PDCCH signals). The means for processing is operably coupled to the means for receiving and configured to: predecode, demodulate, and descramble the plurality of M-PDCCH signals; attempt blind decoding on a first subset of the plurality of M-PDCCH signals associated with a common search space (CSS), wherein at most one M-PDCCH signal of the first subset of M-PDCCH signals is successfully blind decoded; attempt blind decoding of a second subset of the plurality of M-PDCCH signals associated with a UE-specific search space (USS), wherein the attempted blind decoding of the second subset is via a hashing table that is based at least in part on a superframe index; and identify a M-PDCCH signal associated with the UE among the first subset or the second subset upon successful decoding of the M-PDCCH signal associated with the UE as determined by a lack of a cyclic redundancy check (CRC) error after blind decoding of the M-PDCCH signal associated with the UE.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An Evolved NodeB (eNB), comprising:
   a memory storing executable instructions;
   a processor configured to execute the executable instructions to at least:
      determine at least one of downlink or uplink scheduling for one or more narrowband-enabled user equipments (UEs);
      generate, based at least in part on the determined scheduling, one or more narrowband- physical downlink control channel (PDCCH) (NPDCCH) DCI (Downlink Control Information) messages associated with the one or more narrowband-enabled UEs, wherein each of the one or more NPDCCH DCI messages has a narrowband-specific DCI format; and
      perform channel coding, multiplexing, and scrambling of the generated one or more NPDCCH DCI messages; and
   a transmitter circuit configured to map a first NPDCCH DCI message of the one or more NPDCCH DCI messages to orthogonal frequency division multiplexing (OFDM) symbols across a plurality of subframes, and to transmit the one or more NPDCCH DCI messages via a narrowband bandwidth of one physical resource block (PRB),
   wherein the first NPDCCH DCI comprises an indication of a resource assignment subframe for an associated narrowband physical downlink shared channel (PDSCH), wherein the resource assignment subframe for the associated narrowband PDSCH is after the plurality of subframes comprising the first NPDCCH DCI.

2. The eNB of claim 1, wherein the at least one of the downlink or uplink scheduling is determined based on association of identities of the one or more narrowband-enabled UEs with pre-defined resources.

3. The eNB of claim 1, wherein the one or more NPDCCH DCI messages indicate, for each narrowband-enabled UE, whether a downlink transmission or an uplink transmission is scheduled for resources associated with that narrowband-enabled UE.

4. The eNB of claim 1, wherein one of the NPDCCH DCI messages indicates, for each of a plurality of the narrowband-enabled UEs, whether a downlink transmission or an uplink transmission is scheduled for resources associated with that narrowband-enabled UE.

5. The eNB of claim 1, wherein each NPDCCH DCI message comprises four bits that indicate a designated modulation and coding scheme (MCS).

6. The eNB of claim 1, wherein performing scrambling of the one or more NPDCCH DCI messages comprises performing scrambling based on a scrambling sequence initialized with $c_{init}=\lfloor n_s/2 \rfloor 2^9+N_{ID}^{cell}$, wherein $n_s$ is a slot number and $N_{ID}^{cell}$ is a cell ID (identifier).

7. The eNB of claim 1, wherein performing scrambling of the one or more NPDCCH DCI messages comprises performing scrambling based on a scrambling seed that is solely a function of a cell identity.

8. A non-transitory machine readable medium comprising instructions that, when executed, cause an Evolved NodeB (eNB) to:
   schedule a plurality of Internet of Things (IoT) devices for one or more of an uplink grant or a downlink allocation;
   generate at least one Downlink Control Information (DCI) message associated with the plurality of IoT devices, wherein each DCI message of the at least one DCI message has a narrowband-specific DCI format;
   construct one or more narrowband physical downlink control channel (NPDCCH) signals based on the at least one DCI message;
   map a first NPDCCH DCI message of the one or more NPDCCH signals to orthogonal frequency division multiplexing (OFDM) symbols across a plurality of subframes; and
   transmit the one or more NPDCCH signals in one or more NPDCCH regions via a narrowband transmission mode, wherein the narrowband transmission mode comprises narrowband transmission via a bandwidth of one physical resource block (PRB),
   wherein the first NPDCCH DCI comprises an indication of a resource assignment subframe for an associated narrowband physical downlink shared channel (PDSCH), wherein the resource assignment subframe for the associated narrowband PDSCH is after the plurality of subframes comprising the first NPDCCH DCI.

9. The non-transitory machine readable medium of claim 8, wherein an aggregation level of a first NPDCCH signal of the one or more NPDCCH signals is greater than eight.

10. The non-transitory machine readable medium of claim 8, wherein a first DCI message of the at least one DCI message indicates a designated modulation and coding scheme (MCS) via four bits.

11. The non-transitory machine readable medium of claim 8, wherein the instructions, when executed, further cause the eNB to multiplex and scramble the one or more NPDCCH signals based on a scrambling sequence initialized with $c_{init}=\lfloor n_s/2 \rfloor 2^9+N_{ID}^{cell}$, wherein $n_s$ is a slot number and $N_{ID}^{cell}$ is a cell ID (identifier).

12. The non-transitory machine readable medium of claim 8, wherein each DCI message of the at least one DCI message indicates a hybrid automatic repeat request (HARQ) process number of two configured HARQ process numbers via a single bit.

13. The non-transitory machine readable medium of claim 8, wherein a first IoT device of the IoT devices is scheduled via a localized resource allocation scheme.

14. The non-transitory machine readable medium of claim 8, wherein a first IoT device of the IoT devices is scheduled via a distributed resource allocation scheme.

15. The non-transitory machine readable medium of claim 8, wherein a first DCI message of the at least one DCI message indicates whether an uplink transmission or downlink transmission is scheduled for each IoT device in the plurality of the IoT devices.

16. The non-transitory machine-readable medium of claim 8, wherein a user equipment (UE)-specific search space for transmission of the one or more NPDCCH signals is determined in accordance with a superframe number.

17. A user equipment (UE), comprising:
an antenna port configured to receive a narrowband transmission comprising a set of two or more narrowband physical downlink control channel (NPDCCH) Downlink Control Information (DCI) messages, wherein each DCI message of the two or more NPDCCH DCI messages has a narrowband-specific DCI format; and
a processor operably coupled to the antenna port and configured to:
predecode, demodulate, and descramble the set of two or more NPDCCH DCI messages from one or more NPDCCH regions via a narrowband transmission mode, wherein the narrowband transmission mode comprises narrowband transmission via a bandwidth of one physical resource block (PRB);
attempt blind decoding on a first subset of the set of two or more NPDCCH DCI messages associated with a common search space (CSS), wherein at most one NPDCCH DCI message of the first subset is successfully blind decoded;
attempt blind decoding of a second subset of the set of two or more NPDCCH DCI messages associated with a UE-specific search space (USS); and
identify a NPDCCH DCI message associated with the UE among the first subset or the second subset upon successful decoding of the NPDCCH DCI message associated with the UE as determined by a lack of a cyclic redundancy check (CRC) error after blind decoding of the NPDCCH DCI message associated with the UE, wherein the NPDCCH DCI message associated with the UE is mapped to orthogonal frequency division multiplexing (OFDM) symbols across a plurality of subframes,
wherein the NPDCCH DCI message associated with the UE comprises an indication of a resource assignment subframe for an associated narrowband physical downlink shared channel (PDSCH), wherein the resource assignment subframe for the associated narrowband PDSCH is after the plurality of subframes comprising the NPDCCH DCI message associated with the UE.

18. The UE of claim 17, wherein the UE is associated with a cell-radio network temporary identity (C-RNTI), and wherein the processor is configured to determine a scheduled symbol index associated with the UE based at least in part on the C-RNTI.

19. The UE of claim 17, wherein the processor is further configured to determine at least one of a scheduled downlink allocation or a scheduled uplink grant based at least in part on the NPDCCH DCI message associated with the UE.

20. The UE of claim 19, wherein the processor is configured to determine the at least one of the scheduled downlink allocation or the scheduled uplink grant based at least in part on the NPDCCH DCI message.

21. The UE of claim 20, wherein the NPDCCH DCI message indicates the at least one of the scheduled downlink allocation or the scheduled uplink grant via a bit associated with the UE and a predetermined resource.

22. The UE of claim 20, wherein the NPDCCH DCI message dynamically indicates the at least one of the scheduled downlink allocation or the scheduled uplink grant via a localized resource allocation scheme.

23. The UE of claim 20, wherein the NPDCCH DCI message dynamically indicates the at least one of the scheduled downlink allocation or the scheduled uplink grant via a distributed resource allocation scheme.

* * * * *